(12) United States Patent
Oo et al.

(10) Patent No.: US 11,549,795 B2
(45) Date of Patent: Jan. 10, 2023

(54) SLURRY COATING THICKNESS MEASUREMENT

(71) Applicant: Raytheon Technologies Corporation, Farmington, CT (US)

(72) Inventors: Guolin Oo, Singapore (SG); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 27 days.

(21) Appl. No.: 17/238,351

(22) Filed: Apr. 23, 2021

(65) Prior Publication Data
US 2022/0341720 A1    Oct. 27, 2022

(51) Int. Cl.
*G01B 5/06*    (2006.01)

(52) U.S. Cl.
CPC .......... *G01B 5/066* (2013.01); *G01B 2210/58* (2013.01)

(58) Field of Classification Search
CPC ............................. G01B 5/066; G01B 2210/58
See application file for complete search history.

(56) References Cited

U.S. PATENT DOCUMENTS

| | | | |
|---|---|---|---|
| 1,673,266 A | 6/1928 | Pfund | |
| 2,507,592 A | 5/1950 | Euverard | |
| 3,758,957 A * | 9/1973 | Eskijian | G01B 5/066 33/834 |
| 4,169,319 A | 10/1979 | Gardner | |
| 4,377,037 A * | 3/1983 | Taylor | G01B 5/066 33/834 |
| 5,335,305 A * | 8/1994 | Kosa | G02B 6/2552 156/154 |
| 6,026,586 A * | 2/2000 | Waddles | G01B 5/066 33/832 |
| 2002/0000183 A1 | 1/2002 | Lake | |

FOREIGN PATENT DOCUMENTS

| | | | |
|---|---|---|---|
| CN | 110715592 A | 1/2020 | |
| DE | 930898 C | 7/1955 | |
| JP | S61100601 A | 5/1986 | |
| JP | 2000321012 A | 11/2000 | |
| WO | WO-2005065436 A2 * | 7/2005 | ............. B33Y 10/00 |

OTHER PUBLICATIONS

European Search Report for European Application No. 22169331.0; Application Filing Date: Apr. 21, 2022 Date of Search: Sep. 20, 2022; 7 pages.

* cited by examiner

*Primary Examiner* — Thai Q Tran
*Assistant Examiner* — Jose M Mesa
(74) *Attorney, Agent, or Firm* — Cantor Colburn LLP (57) ABSTRACT

Disclosed herein is a gauge for slurry coating thickness determination. The gauge includes a body and at least three probes extending from the body. The at least three probes provide a go-no-go indicator including a first demarcation that defines a minimum slurry coating thickness and a second demarcation that defines a maximum slurry coating thickness. A minimum no-go region is defined between the first demarcation and a probe tip, a maximum no-go region is defined between the second demarcation and the body, and a go region is defined between the first demarcation and the second demarcation.

20 Claims, 8 Drawing Sheets

SLURRY COATING THICKNESS MEASUREMENT

BACKGROUND

Exemplary embodiments of the present disclosure pertain to the art of manufacturing, and more particularly to slurry coating thickness measurement during a manufacturing or component repair process.

Manufacturing and repair processes for some types of components can include application of a coating material applied as a slurry. The slurry can include a metal mixture applied through spraying or dipping a portion of a solid component followed by a drying process to harden the slurry and bind the coating to the solid surface of the component.

The thickness of slurry material applied onto surfaces plays a role in the subsequent content diffusion into the coated parts. There is no quick and simple method to directly measure the thickness of a slurry coating applied to a part, especially in small areas of a part. Measurement of coating thickness may be performed in some instances using a device with at least a portion of its circumference convexly curved, e.g., a circular disc. Such measurement technology can involve rolling of the device over an intended measurement area, which is not feasible for small areas, such as blade root faces on turbine blades in the context of a gas turbine engine. Further, variations in dimensions of parts as manufactured may reduce the measurement accuracy of roller-type measurement devices. There is a need to maintain an appropriate range of coating thickness applied as a slurry on surfaces with complex geometries and/or areas that are too small for roller-type measurement.

BRIEF DESCRIPTION

Disclosed is a gauge for slurry coating thickness determination. The gauge includes a body and at least three probes extending from the body. The at least three probes provide a go-no-go indicator including a first demarcation that defines a minimum slurry coating thickness and a second demarcation that defines a maximum slurry coating thickness. A minimum no-go region is defined between the first demarcation and a probe tip, a maximum no-go region is defined between the second demarcation and the body, and a go region is defined between the first demarcation and the second demarcation.

In addition to one or more of the features described above, or as an alternative to any of the foregoing embodiments, the probe tip of each of the at least three probes can have a rounded profile.

In addition to one or more of the features described above, or as an alternative to any of the foregoing embodiments, the go region can have a different color than the minimum no-go region and the maximum no-go region.

In addition to one or more of the features described above, or as an alternative to any of the foregoing embodiments, the go region can have a different cross-sectional shape than the minimum no-go region and the maximum no-go region.

In addition to one or more of the features described above, or as an alternative to any of the foregoing embodiments, the go region can have a different radial dimension than the minimum no-go region and the maximum no-go region.

In addition to one or more of the features described above, or as an alternative to any of the foregoing embodiments, the go region can have a different surface texture than the minimum no-go region and the maximum no-go region.

In addition to one or more of the features described above, or as an alternative to any of the foregoing embodiments, the minimum no-go region, the maximum no-go region, and the go region can be distributed between at least two of the at least three probes.

In addition to one or more of the features described above, or as an alternative to any of the foregoing embodiments, the at least three probes can include a go-probe having a first height offset with respect to at least one contact-probe configured to contact a solid surface of a component coated by a slurry, and a maximum-no-go-probe having a second height offset from the first height, where a tip of the go-probe indicates the first demarcation and a tip of the maximum-no-go-probe indicates the second demarcation.

In addition to one or more of the features described above, or as an alternative to any of the foregoing embodiments, the at least three probes can include three pin gauges in a tripod distribution on a same surface of the body, and the at least three probes can be rigid and statically coupled to the body.

Also disclosed is a method for measuring a slurry coating thickness on a component. The method includes positioning at least two probe tips of a gauge including three or more probes on a solid surface of the component coated by a slurry, where the three or more probes extend from a body of the gauge. The slurry is observed based on a go-no-go indicator after the at least two probe tips make contact with the solid surface of the component. The go-no-go indicator includes a first demarcation that defines a minimum slurry coating thickness and a second demarcation that defines a maximum slurry coating thickness. A minimum no-go region is defined between the first demarcation and the probe tip, a maximum no-go region is defined between the second demarcation and the body, and a go region is defined between the first demarcation and the second demarcation. The method also includes determining that the slurry coating thickness on the component exceeds a maximum thickness based on detecting the slurry level at the maximum no-go region, determining that the slurry coating thickness on the component is below a minimum thickness based on detecting the slurry level at the minimum no-go region, and determining that the slurry coating thickness on the component meets a target thickness based on detecting the slurry level at the go region.

Also disclosed is a system for slurry coating thickness determination. The system includes a gauge having a body and at least three probes extending from the body. The at least three probes provide a go-no-go indicator including a first demarcation that defines a minimum slurry coating thickness and a second demarcation that defines a maximum slurry coating thickness. A minimum no-go region is defined between the first demarcation and a probe tip, a maximum no-go region is defined between the second demarcation and the body, and a go region is defined between the first demarcation and the second demarcation. The system also includes a camera configured to observe a component and a controller coupled to the camera. The controller is configured to observe a slurry on the component based on the go-no-go indicator after at least two probe tips of the at least three probes make contact with a solid surface of the component coated by the slurry. The controller is further configured to determine that the slurry coating thickness on the component exceeds a maximum thickness based on detecting the slurry level at the maximum no-go region, determine that the slurry coating thickness on the component is below a minimum thickness based on detecting the slurry level at the minimum no-go region, and determine that the slurry coating thickness on the component meets a target thickness based on detecting the slurry level at the go region.

In addition to one or more of the features described above, or as an alternative to any of the foregoing embodiments, the controller can be configured to position the gauge with respect to the component.

In addition to one or more of the features described above, or as an alternative to any of the foregoing embodiments, the controller can be configured to trigger an alert based on determining the slurry coating thickness using one or more images captured by the camera.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Slurry coatings can be used in manufacturing and/or repair processes on one or more targeted surfaces of a component. Before the slurry coating hardens on the component, embodiments enable an inspection process to determine whether the slurry coating applied on the component is within required dimensions. As further described herein, slurry coating thickness measurement can be performed using a gauge. The gauge can include multiple probes extending from a body and may include at least three probe pins in close physical proximity (e.g., a tripod configuration) to minimize contact area and reduce unwanted interference on the coating during usage of the gauge. Each probe can be demarcated into at least two regions, including a go region and at least one no-go region. To optimize slurry coating thickness without excessively wasteful application, there can be two no-go regions, including a minimum no-go region and a maximum no-go region. The minimum no-go region can be used to inspect for an insufficient coating thickness, while the maximum no-go region can be used to inspect for an excessive coating thickness. The go region and no-go regions can be differentiated visually by the usage of differing colors (e.g., green for go and red for no-go) and/or other features, such as differing radial dimensions and surface textures. By including at least three probes, the gauge can provide better consistency and ensure perpendicularity. The distance from the probe tips to the start and end of the go region can be designed to meet an acceptable range of the slurry coating thickness. Multiple versions of the gauge can be created to match specific components or portions of components where dimensions and/or coating thickness requirements vary. Other go-no-go gauge and probe configurations are also described further herein.

Figure 1:
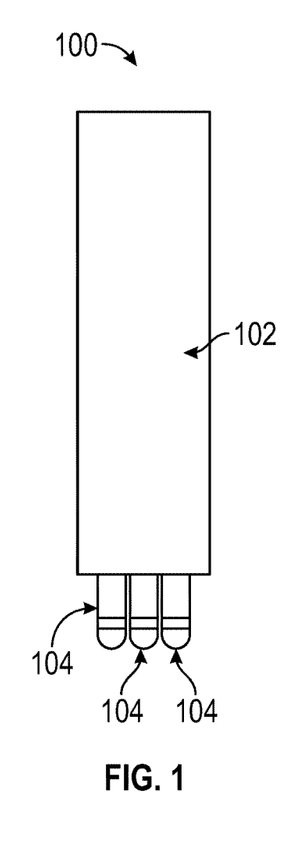
FIG. 1 is a schematic view of a gauge for slurry coating thickness determination according to an embodiment.

FIG. 1 shows a schematic view of a gauge 100 for slurry coating thickness determination according to an embodiment. In the example of FIG. 1, the gauge 100 includes a body 102 and at least three probes 104 extending from the body 102. As depicted in greater detail in FIG. 2, each of the at least three probes 104 has a go-no-go indicator 105 including a first demarcation 106 that defines a minimum slurry coating thickness and a second demarcation 108 that defines a maximum slurry coating thickness. A minimum no-go region 110 is defined between the first demarcation 106 and a probe tip 112. A maximum no-go region 114 is defined between the second demarcation 108 and the body 102. A go region 116 is defined between the first demarcation 106 and the second demarcation 108.

Figure 2:
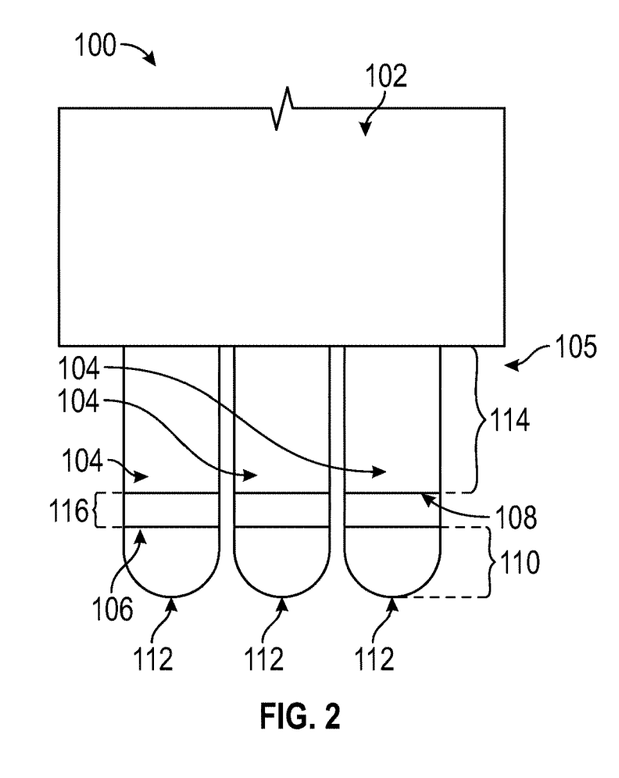
FIG. 2 is an enhanced view of probes of the gauge of FIG. 1 according to an embodiment.
Figure 3:
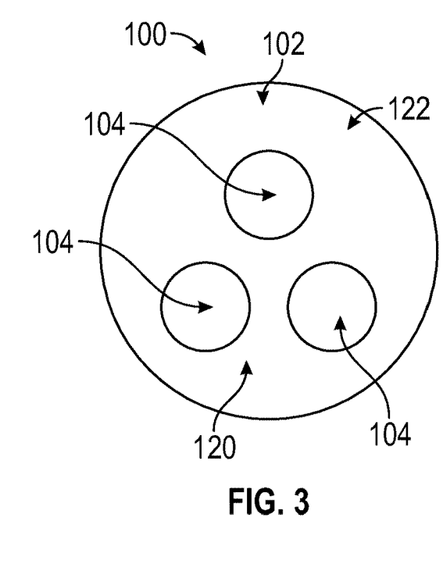
FIG. 3 is an end view of the gauge of FIG. 1 according to an embodiment.

FIG. 3 is an end view of the gauge 100 of FIGS. 1 and 2 according to an embodiment. As can be seen in the example of FIGS. 1-3, the body 102 of the gauge 100 can be substantially cylindrical or can have other shapes to enhance user grip and/or engagement with other tooling. Further, the probes 104 can be three pin gauges in a tripod distribution 120 on a same surface 122 (e.g., a bottom surface) of the body 102. In the tripod distribution 120, a greater degree of stability and contact can be provided on the surface of a slurry coated component such that observations of the slurry level of the go-no-go indicators 105 of the probes 104, as depicted in FIG. 2, can provide an observer with a greater degree of confidence that the probes 104 are substantially perpendicular to the surface of the slurry coated component.

Figure 4:
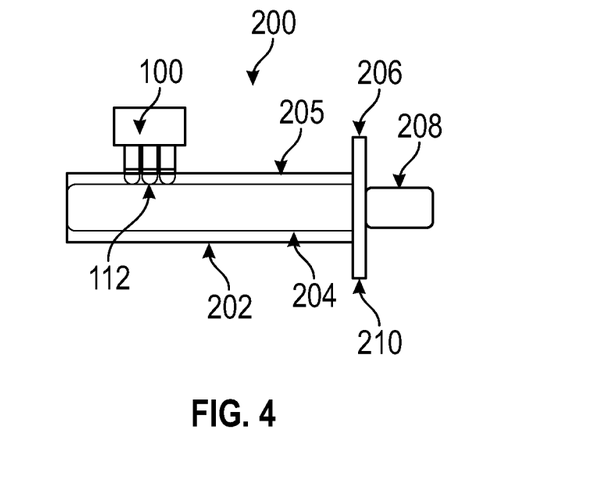
FIG. 4 is a schematic view of a measurement of a slurry coating thickness on a first surface of a component according to an embodiment.

FIG. 4 is a schematic view of a configuration 200 with a measurement of a slurry coating 202 on a first surface 204 of a component 206 according to an embodiment. The component 206 can be, for example, an engine component of a gas turbine engine, where the first surface 204 may be an airfoil. Probe tips 112 of the gauge 100 contact the first surface 204 as a solid surface to make a go-no-go determination of a slurry level 205 indicative of the thickness of the slurry coating 202. The component 206 of FIG. 4 also includes a second surface 208 and a third surface 210, which may be uncoated or coated during a different stage of processing as further depicted in the examples of FIGS. 5 and 6.

Figure 5:
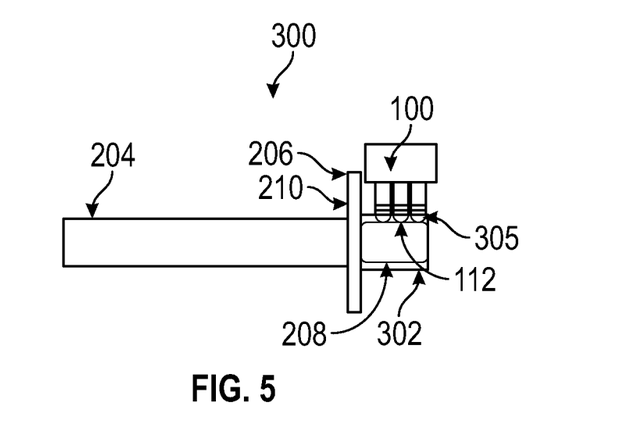
FIG. 5 is a schematic view of a measurement of a slurry coating thickness on a second surface of a component according to an embodiment.

FIG. 5 is a schematic view of a configuration 300 with a measurement of a slurry coating 302 on the second surface 208 of the component 206 according to an embodiment. Probe tips 112 of the gauge 100 contact a second surface 208 as a solid surface to make a go-no-go determination of a slurry level 305 indicative of the thickness of the slurry coating 302. The component 206 of FIG. 5 also includes the first surface 204 and the third surface 210, which may be uncoated or coated as part of another stage of processing. Where the slurry coating thickness requirement for the second surface 208 differs from the first surface 204, the positioning of the demarcations of the go-no-go indicator and/or probe dimensions for the gauge 100 in FIG. 5 may differ from the example of FIG. 4.

Figure 6:
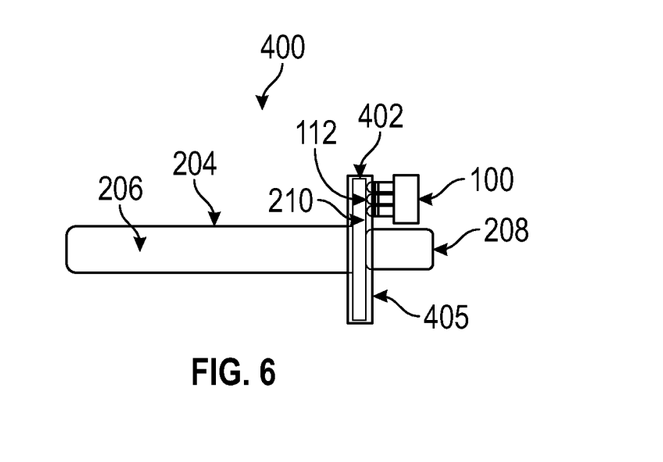
FIG. 6 is a schematic view of a measurement of a slurry coating thickness on a third surface of a component according to an embodiment.

FIG. 6 is a schematic view of a configuration 400 with a measurement of a slurry coating 402 on the second surface 208 of the component 206 according to an embodiment. Probe tips 112 of the gauge 100 contact the third surface 210 as a solid surface to make a go-no-go determination of a slurry level 405 indicative of the thickness of the slurry coating 402. The component 206 of FIG. 6 also includes the first surface 204 and the second surface 208, which may be uncoated or coated as part of another stage of processing. Where the slurry coating thickness requirement for the third surface 210 differs from the first surface 204 or the second surface 208, the positioning of the demarcations of the go-no-go indicator and/or probe dimensions for the gauge 100 in FIG. 6 may differ from the examples of FIGS. 4 and 5.

Figure 7:
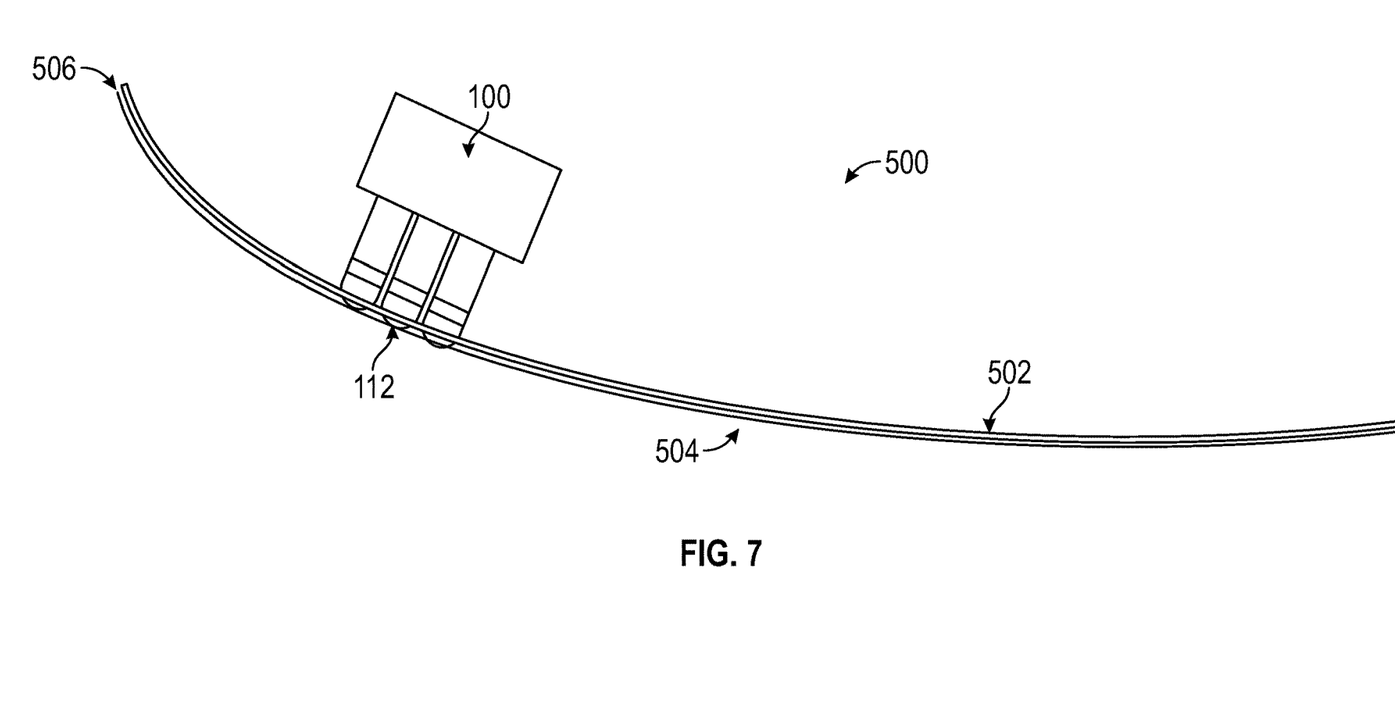
FIG. 7 is a schematic view of a measurement of a slurry coating thickness on a curved surface of a component according to an embodiment.

FIG. 7 is a schematic view of a configuration 500 to measure a slurry coating thickness 502 on a curved surface 504 of a component 506 according to an embodiment. For example, the component 506 can be an airfoil or a blade root face with a relatively small inspection area. The close proximity of the probe tips 112 to each other can enable a higher accuracy slurry thickness inspection of the curved surface 504.

Figures 8, 9:
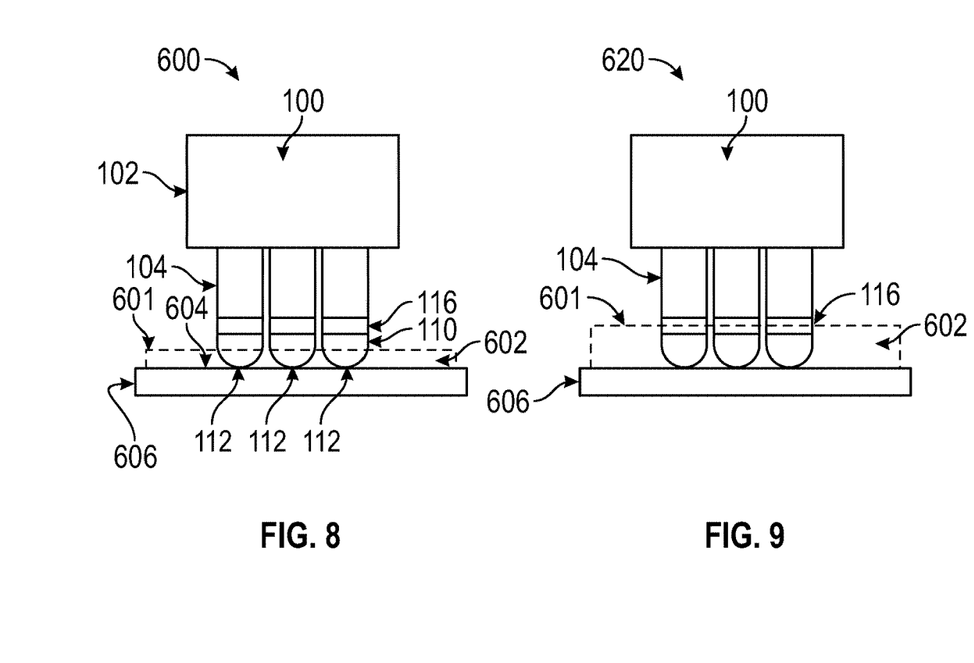
FIG. 8 is a schematic view of a measurement of a slurry coating thickness on a surface of a component below a minimum thickness according to an embodiment.
FIG. 9 is a schematic view of a measurement of a slurry coating thickness on a surface of a component that meets a target thickness according to an embodiment.
Figure 10:
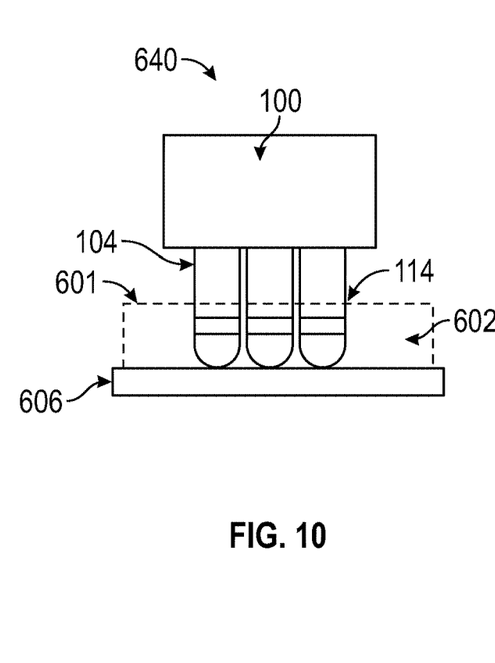
FIG. 10 is a schematic view of a measurement of a slurry coating thickness on a surface of a component that exceeds a maximum thickness according to an embodiment.

FIG. 8 is a schematic view of a measurement 600 of a slurry level 601 indicative of a thickness of a slurry coating 602 on a solid surface 604 of a component 606 below a minimum thickness according to an embodiment. The body 102 of the gauge 100 can be positioned such that the probe tips 112 push through the slurry coating 602 until contacting the solid surface 604. The slurry level 601 is the peak level of the slurry coating 602 on the probes 104 after reaching a steady state condition. Thus, since the slurry level 601 of the slurry coating 602 only reaches the minimum no-go region 110, the thickness of the slurry coating 602 on the component 606 is below a minimum thickness. Additional slurry coating 602 can be added until slurry level 601 reaches the go-region 116. An example of this is depicted in FIG. 9, where measurement 620 results in determining that the slurry level 601 reaches the go-region 116 and therefore, the thickness of the slurry coating 602 on the component 606 meets a target thickness. If the thickness of the slurry coating 602 on the component 606 exceeds a maximum thickness, as indicated by the slurry level 601 reaching the maximum no-go region 114 as depicted in the example of FIG. 10, then slurry coating 602 can be removed until the slurry level 601 reverts back to the go region 116 as illustrated in the example of FIG. 9. Thus, the use of the gauge 100 can simplify the process of adding and removing the slurry coating 602, as a precise amount of material to add or remove need not be computed, but the observation of the slurry level 601 can provide visual feedback to a human observer or a machine to confirm that a desired thickness of the slurry coating 602 has been achieved.

Figure 11:
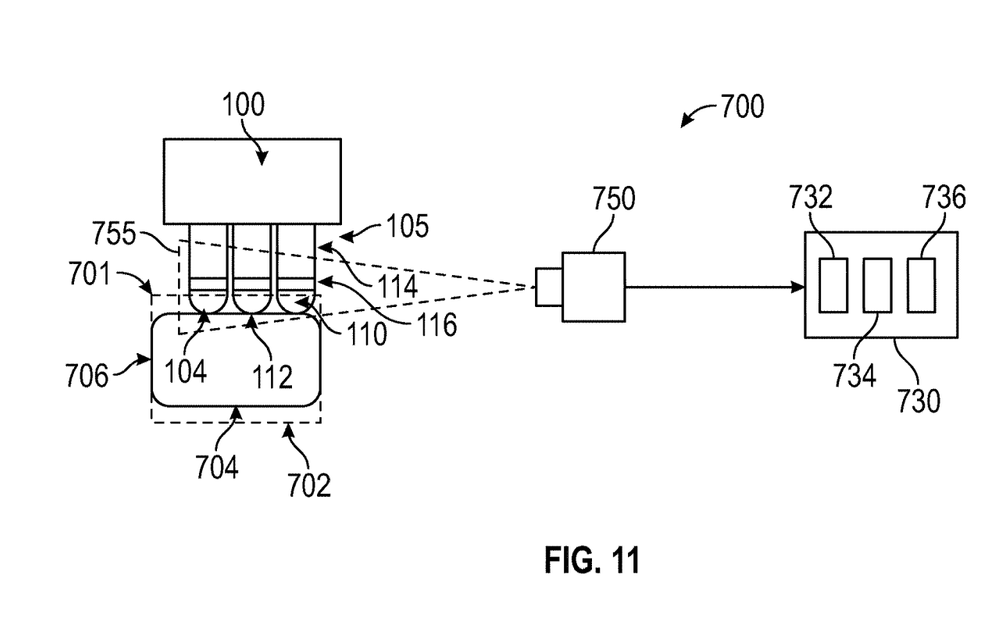
FIG. 11 is a schematic view of a system for slurry coating thickness determination according to an embodiment.

FIG. 11 is a schematic view of a system 700 for slurry coating thickness determination according to an embodiment. The system 700 can include a controller 730 coupled to a camera 750 to capture images of the go-no-go indicator 105 of the probes 104 of gauge 100 relative to a slurry level 701 of a slurry coating 702 on a component 706. After the probe tips 112 of the probes 104 are positioned on a solid surface 704 of the component 706, the camera 750 can capture images within a field of view 755 to determine whether the slurry level 701 aligns with the minimum no-go region 110, the maximum no-go region 114, or the go region 116.

The controller 730 can include a processing system 732 and a memory system 734, where the memory system 734 stores executable instructions to configure the processing system 732 to perform a plurality of operations. The processing system 732 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 734 can store data and instructions that are executed by the processing system 732. In embodiments, the memory system 734 may include random access memory (RAM), read only memory (ROM), or other electronic, optical, magnetic, or any other computer readable medium onto which is stored data and algorithms in a non-transitory form. The controller 730 can also include an input/output (I/O) interface 736 operable to interface with various components of the system 700 to sense, control, and communicate with components of FIG. 1 and other components (not depicted), such as a user interface.

As one example, the controller 730 may be configured to control the positioning of the gauge 100 and/or the component 706. The controller 730 may be configured to control the addition or removal of the slurry coating 702 on the solid surface 704 of the component 706, such as through a spray, dip, or flow process. In some embodiments, the controller 730 may trigger an alert based on determining the slurry coating 702 thickness using one or more images captured by the camera 750 of the slurry level 701. The camera 750 need not observe all of the probes 104 to make the determination. The alert may be an indication for an operator or device to apply more of the slurry coating 702, remove a portion of the slurry coating 702, or confirm that a desired thickness has been achieved. Using a go-no-go approach, the image processing requirements can be reduced, as a high degree of precision is not needed to make a more generalized go-no-go determination.

Figure 12:
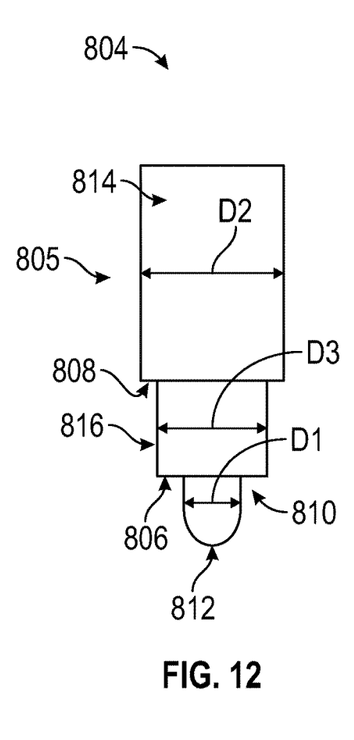
FIG. 12 is a probe for slurry coating thickness determination according to an embodiment.
Figure 13:
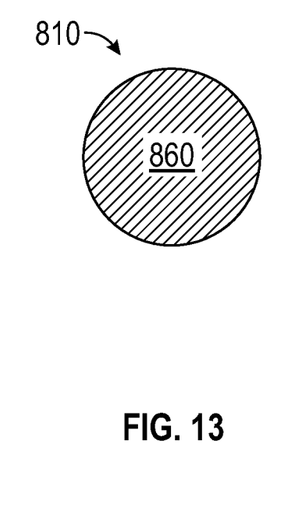
FIG. 13 is a cross-section of a minimum no-go region of a probe for slurry coating thickness determination according to an embodiment.
Figure 14:
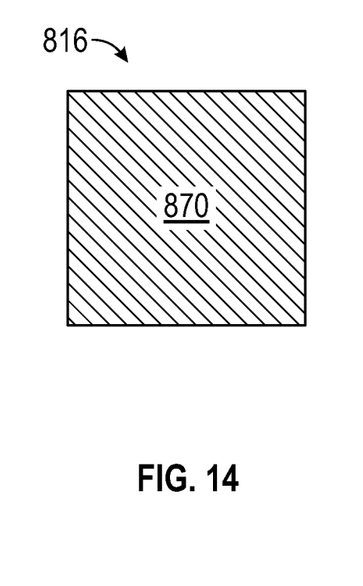
FIG. 14 is a cross-section of a go region of a probe for slurry coating thickness determination according to an embodiment.
Figure 15:
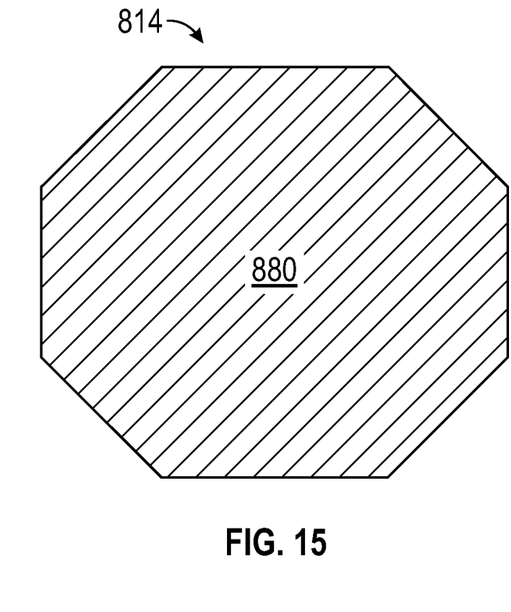
FIG. 15 is a cross-section of a maximum no-go region of a probe for slurry coating thickness determination according to an embodiment.

FIG. 12 depicts another example of a probe 804 for slurry coating thickness determination according to an embodiment. The probe 804 is an alternate embodiment of the probes 104 of FIGS. 1-11 illustrating that other features beyond color differences can be used to distinguish go-no-go regions. For example, the probe 804 includes a go-no-go indicator 805 including a first demarcation 806 that defines a minimum slurry coating thickness and a second demarcation 808 that defines a maximum slurry coating thickness. A minimum no-go region 810 is defined between the first demarcation 806 and a probe tip 812. A maximum no-go region 814 is defined as a region above the second demarcation 808. A go region 816 is defined between the first demarcation 806 and the second demarcation 808. Rather than using color, the first demarcation 806 and the second demarcation 808 can be defined based on a difference in radial dimension of the probe 804, cross-sectional shapes, and/or a different surface textures. For instance, a first radial dimension D1 of the minimum no-go region 810 and/or a second radial dimension D2 of the maximum no-go region 814 can differ from a third radial dimension D3 of the go region 816 (e.g., D2>D3>D1). Using different cross-sectional shapes for each section of the probe 804 can leave a visual indication (e.g., a circle, a rectangle, an octagon, etc.) in the slurry where the slurry is in a sufficiently non-viscous state. For example, the minimum no-go region 810 can have a circular cross-sectional shape 860 (FIG. 13), while the go region 816 has a rectangular cross-sectional shape 870 (FIG. 14), and the maximum no-go region 814 has an octagon cross-sectional shape 880 (FIG. 15). Other shape combinations may be used beyond those depicted in the example of FIGS. 13-15. Alternatively or additionally, the surface texture of the go region 816 may be visually distinct, such as a knurled surface, as compared to the surface texture of the minimum no-go region 810 and/or the maximum no-go region 814, which may be smooth, for instance. Other feature variations are contemplated beyond these examples.

Figure 16:
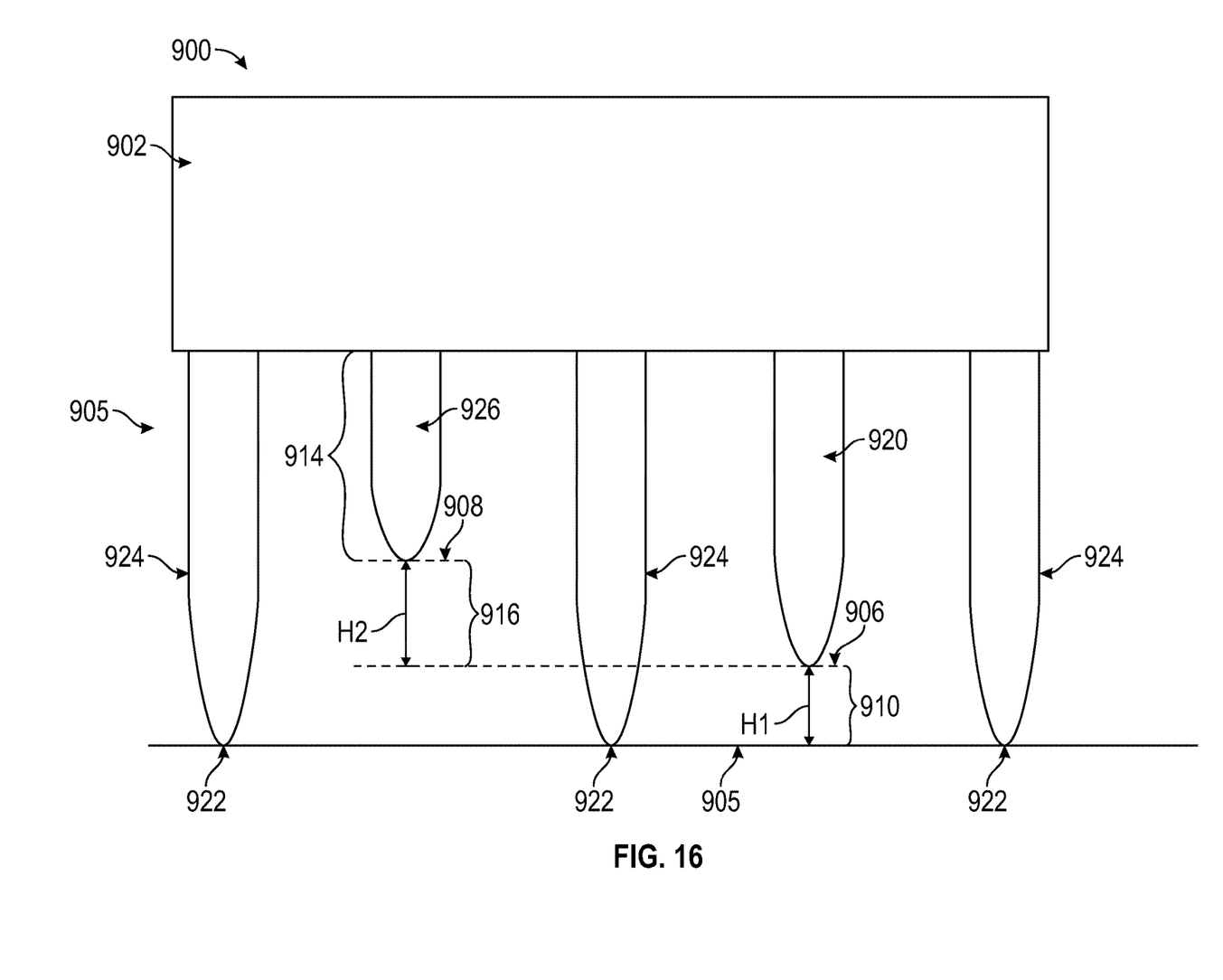
FIG. 16 is a schematic view of a gauge for slurry coating thickness determination according to an embodiment.

FIG. 16 is a schematic view of a gauge 900 for slurry coating thickness determination according to an embodiment. Similar to the gauge 100 of FIG. 1, the gauge 900 includes a body 902 and a plurality of probes extending from the body 902. Rather than using a single probe 104 as in FIG. 1, the gauge 900 defines a minimum no-go region 910, a maximum no-go region 914, and a go region 916 distributed between at least two probes. A go-probe 920 has a first height (H1) offset with respect to a probe tip 922 of at least one contact-probe 924 configured to contact a solid surface 905 of a component coated by a slurry. A maximum-no-go-probe 926 has a second height offset (H2) from the first height H1. A tip of the go-probe 920 can define a first demarcation 906, and a tip of the maximum-no-go-probe 926 can define a second demarcation 908. The first demarcation 906 is a transition level between the minimum no-go region 910 and the go region 916, and the second demarcation 908 is a transition level between the go region 916 and the maximum no-go region 914. Including at least two contact-probes 924 can better ensure that the gauge 900 is substantially level with respect to the solid surface 905. Including at least three contact-probes 924 may further enhance stability of the gauge 900 when the contact-probes 924 are placed on the solid surface 905. To continue with the example of FIG. 16, placing the contact-probes 924 on the solid surface 905 with a partially hardened slurry and then lifting the gauge 900 would reveal three marks (e.g., one for each of the contact-probes 924) if the slurry level is too low (e.g., below the first demarcation 906 defined by the tip of the go-probe 920). Four marks would indicate that the slurry level is in the go range by reaching the first demarcation 906 defined by the tip of the go-probe 920 but not reaching the second demarcation 908 defined by the maximum-no-go-probe 926. Therefore, it follows that five marks in the slurry coating the solid surface 905 would indicate that the slurry level is too thick by reaching the second demarcation 908 defined by the maximum-no-go-probe 926.

Figure 17:
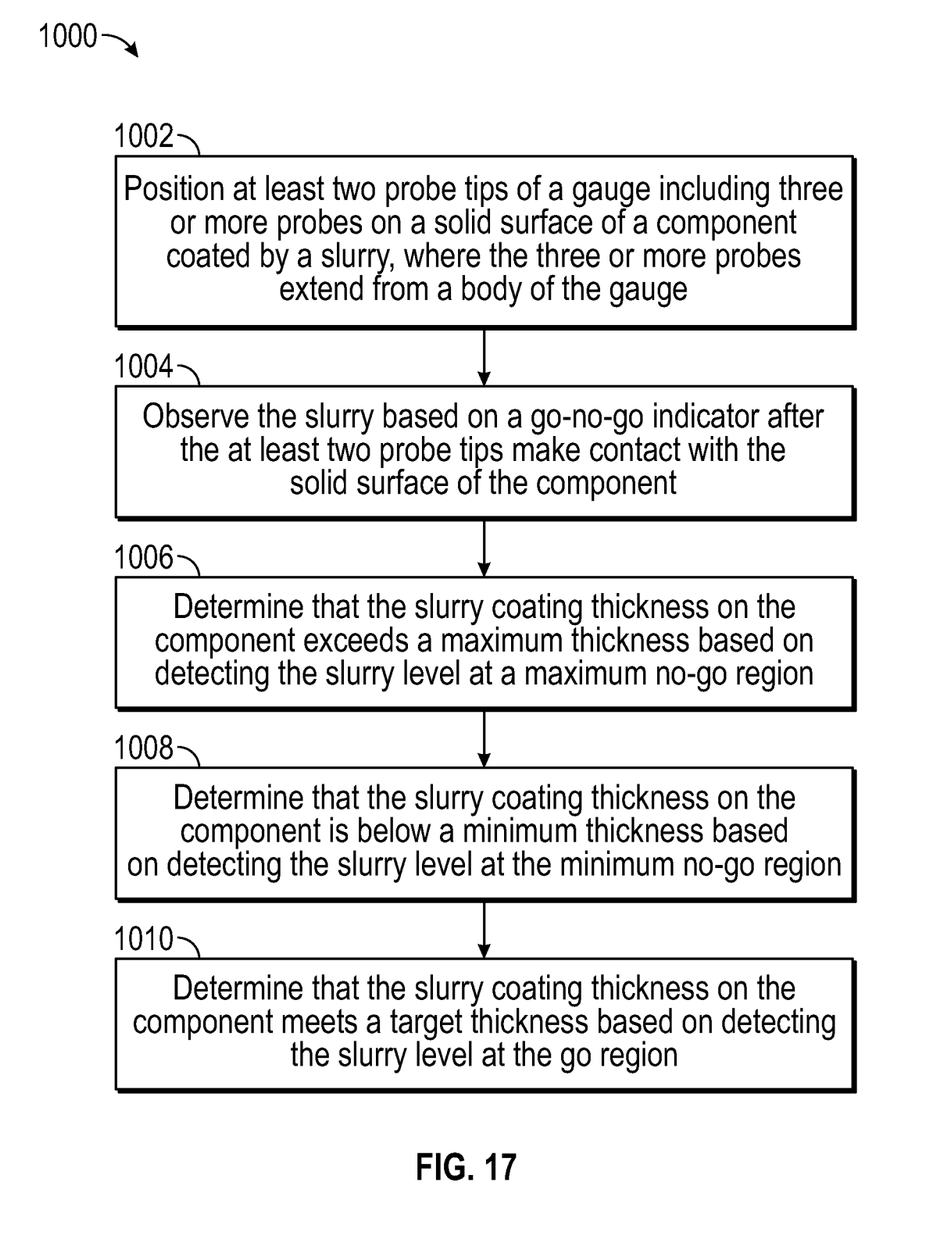
FIG. 17 is a process flow according to an embodiment.

Turning to FIG. 17, a flowchart shows a method 1000 for measuring a slurry coating thickness on a component according to an embodiment. The method 1000 of FIG. 17 is described with respect to FIGS. 1-17 and may include additional steps beyond those depicted in FIG. 17. The method 1000 can be controlled by a control system, such as the controller 730 of FIG. 11 with supporting devices, or may be performed in part or entirely by one or more human operators. For instance, some portions of the method 1000 can be manually performed depending on the amount of automation available. The method 1000 is described primarily in reference to various examples from FIGS. 1-16 for purposes of explanation, although it will be understood that variations and sub-combinations of previously described elements and/or additional elements can be used to implement the method 1000.

In reference to the example of FIGS. 8-10, initially, an amount of a slurry coating 602 can be applied to a solid surface 604 of a component 606. At block 1002, at least two probe tips 112 of a gauge 100 that includes three or more probes 104 can be positioned on a solid surface 604 of the component 606 coated by a slurry 602, where the three or more probes 104 extend from a body 102 of the gauge 100. Alternatively, at least two probe tips 922 of the gauge 900 can be used.

At block 1004, slurry coating 602 can be observed based on a go-no-go indicator 105 after at least two probe tips 112 make contact with the solid surface 604 of the component 606. The observation can be made while the probe tips 112 make contact with the slurry coating 602 or the slurry coating 602 can be observed after contact is made, where distinguishing marks left in the slurry indicate a go-no-go status as described, for example, with respect to FIGS. 12-16 (e.g., shape and/or number of marks). As an example, a slurry level 601 on at least two of the probes 104 of the gauge 100 can be compared to a go-no-go indicator 105 on each of the probes 104 while the at least two probe tips 112 make contact with the solid surface 604 of the component 606. As previously described in reference to FIG. 2, the go-no-go indicator 105 can include a first demarcation 106 that defines a minimum slurry coating thickness and a second demarcation 108 that defines a maximum slurry coating thickness, where a minimum no-go region 110 is defined between the first demarcation 106 and the probe tip 112, a maximum no-go region 114 is defined between the second demarcation 108 and the body 102, and a go region 116 is defined between the first demarcation 106 and the second demarcation 108.

At block 1006, the slurry coating 602 thickness on the component 606 can be determined as exceeding a maximum thickness based on detecting the slurry level 601 at the maximum no-go region 114, which can be on at least two of the probes 104, such as measurement 640.

At block 1008, the slurry coating 602 thickness on the component 606 can be determined as being below a minimum thickness based on detecting the slurry level 601 at the minimum no-go region 110, which can be on at least two of the probes 104, such as measurement 600.

At block 1010, the slurry coating 602 thickness on the component 606 can be determined as meeting a target thickness based on detecting the slurry level 601 at the go region 116, which can be on at least two of the probes 104, such as measurement 620.

In some embodiments, the probe tip 112 of each of the at least three probes 104 has a rounded profile. The go region 116 can have a different color (e.g., green) than the minimum no-go region 110 and the maximum no-go region 114 (e.g., red). As such, the first demarcation 106 can be defined by a first color transition between the minimum no-go region 110 and the go region 116, and the second demarcation 108 can be defined by a second color transition between the maximum no-go region 114 and the go region 116. In some embodiments, the go region 116 can have a different radial dimension (e.g., D3) than the minimum no-go region 110 and/or the maximum no-go region 114 (e.g., D1, D2). Further, the go region can have a different cross-sectional shape than the minimum no-go region and the maximum no-go region as depicted, for example, in FIGS. 13-15. The go region 116 can have a different surface texture than the minimum no-go region 110 and/or the maximum no-go region 114. The at least three probes 104 can be three pin gauges in a tripod distribution 120 on a same surface 122 of the body 102. The at least three probes 104 can be rigid and statically coupled to the body 102. Further, with respect to the example of FIG. 16, the probes of gauge 900 can include a go-probe 920 having a first height H1 offset with respect to at least one contact-probe 924 configured to contact a solid surface 905 of a component coated by a slurry and a maximum-no-go-probe 926 having a second height H2 offset from the first height H1, where a tip of the go-probe 920 serves as the first demarcation 906 and a tip of the maximum-no-go-probe 926 serves as the second demarcation 908.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gauge for slurry coating thickness determination, the gauge comprising:
   a body; and
   at least three probes extending from the body, the at least three probes providing a go-no-go indicator comprising a first demarcation that defines a minimum slurry coating thickness and a second demarcation that defines a maximum slurry coating thickness, wherein a minimum no-go region is defined between the first demarcation and a probe tip, a maximum no-go region is defined between the second demarcation and the body, and a go region is defined between the first demarcation and the second demarcation.

2. The gauge of claim 1, wherein the probe tip of each of the at least three probes comprises a rounded profile.

3. The gauge of claim 1, wherein the go region has a different color than the minimum no-go region and the maximum no-go region.

4. The gauge of claim 1, wherein the go region has a different cross-sectional shape than the minimum no-go region and the maximum no-go region.

5. The gauge of claim 1, wherein the go region has a different radial dimension than the minimum no-go region and the maximum no-go region.

6. The gauge of claim 1, wherein the go region has a different surface texture than the minimum no-go region and the maximum no-go region.

7. The gauge of claim 1, wherein the minimum no-go region, the maximum no-go region, and the go region are distributed between at least two of the at least three probes.

8. The gauge of claim 7, wherein the at least three probes comprise:
   a go-probe having a first height offset with respect to at least one contact-probe configured to contact a solid surface of a component coated by a slurry; and
   a maximum-no-go-probe having a second height offset from the first height, wherein a tip of the go-probe comprises the first demarcation and a tip of the maximum-no-go-probe comprises the second demarcation.

9. The gauge of claim 1, wherein the at least three probes comprise three pin gauges in a tripod distribution on a same surface of the body, and further wherein the at least three probes are rigid and statically coupled to the body.

10. A method for measuring a slurry coating thickness on a component, the method comprising:
    positioning at least two probe tips of a gauge comprising three or more probes on a solid surface of the component coated by a slurry, wherein the three or more probes extend from a body of the gauge;
    observing the slurry based on a go-no-go indicator after the at least two probe tips make contact with the solid surface of the component, wherein the go-no-go indicator comprises a first demarcation that defines a minimum slurry coating thickness and a second demarcation that defines a maximum slurry coating thickness, wherein a minimum no-go region is defined between the first demarcation and the probe tip, a maximum no-go region is defined between the second demarcation and the body, and a go region is defined between the first demarcation and the second demarcation;
    determining that the slurry coating thickness on the component exceeds a maximum thickness based on detecting the slurry level at the maximum no-go region;
    determining that the slurry coating thickness on the component is below a minimum thickness based on detecting the slurry level at the minimum no-go region; and
    determining that the slurry coating thickness on the component meets a target thickness based on detecting the slurry level at the go region.

11. The method of claim 10, wherein the probe tip of each of the at least three probes comprises a rounded profile.

12. The method of claim 10, wherein the go region has a different color than the minimum no-go region and the maximum no-go region.

13. The method of claim 10, wherein the go region has a different cross-sectional shape than the minimum no-go region and the maximum no-go region.

14. The method of claim 10, wherein the go region has a different radial dimension than the minimum no-go region and the maximum no-go region.

15. The method of claim 10, wherein the go region has a different surface texture than the minimum no-go region and the maximum no-go region.

16. The method of claim 10, wherein the at least three probes comprise:
   a go-probe having a first height offset with respect to at least one contact-probe configured to contact a solid surface of a component coated by a slurry; and
   a maximum-no-go-probe having a second height offset from the first height, wherein a tip of the go-probe comprises the first demarcation and a tip of the maximum-no-go-probe comprises the second demarcation.

17. The method of claim 10, wherein the at least three probes comprise three pin gauges in a tripod distribution on a same surface of the body, and further wherein the at least three probes are rigid and statically coupled to the body.

18. A system for slurry coating thickness determination, the system comprising:
   a gauge comprising a body and at least three probes extending from the body, the at least three probes providing a go-no-go indicator comprising a first demarcation that defines a minimum slurry coating thickness and a second demarcation that defines a maximum slurry coating thickness, wherein a minimum no-go region is defined between the first demarcation and a probe tip, a maximum no-go region is defined between the second demarcation and the body, and a go region is defined between the first demarcation and the second demarcation;
   a camera configured to observe a component; and
   a controller coupled to the camera, the controller configured to:
      observe a slurry on the component based on the go-no-go indicator after at least two probe tips of the at least three probes make contact with a solid surface of the component coated by the slurry;
      determine that the slurry coating thickness on the component exceeds a maximum thickness based on detecting the slurry level at the maximum no-go region;
      determine that the slurry coating thickness on the component is below a minimum thickness based on detecting the slurry level at the minimum no-go region; and
      determine that the slurry coating thickness on the component meets a target thickness based on detecting the slurry level at the go region.

19. The system of claim 18, wherein the controller is configured to position the gauge with respect to the component.

20. The system of claim 18, wherein the controller is configured to trigger an alert based on determining the slurry coating thickness using one or more images captured by the camera.

* * * * *